United States Patent
Umegaki et al.

(10) Patent No.: US 7,140,243 B2
(45) Date of Patent: Nov. 28, 2006

(54) TIRE INFLATION PRESSURE DETECTING DEVICE FOR VEHICLE

(75) Inventors: Katsuyuki Umegaki, Shizuoka (JP); Kenichi Katsumata, Shizuoka (JP); Tsutomu Nakao, Kunitachi (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/994,486

(22) Filed: Nov. 23, 2004

(65) Prior Publication Data
US 2005/0109094 A1    May 26, 2005

(30) Foreign Application Priority Data
Nov. 26, 2003    (JP)    ............................. P2003-395698

(51) Int. Cl.
*B60C 23/02* (2006.01)
*B60C 23/06* (2006.01)

(52) U.S. Cl. ........................................................ 73/146

(58) Field of Classification Search ................... 73/146
See application file for complete search history.

(56) References Cited

U.S. PATENT DOCUMENTS

| | | | | |
|---|---|---|---|---|
| 5,289,160 A | * | 2/1994 | Fiorletta | .................... 340/447 |
| 6,304,172 B1 | * | 10/2001 | Katou et al. | ................ 73/146.5 |
| 6,340,930 B1 | * | 1/2002 | Lin | ............................. 73/146 |
| 6,691,567 B1 | * | 2/2004 | Walker et al. | ................. 73/146 |
| 6,788,193 B1 | * | 9/2004 | King et al. | .................... 73/146 |
| 6,931,923 B1 | * | 8/2005 | Katou et al. | ................ 73/146.5 |
| 2003/0164032 A1 | * | 9/2003 | Nantz et al. | .................. 73/146 |
| 2004/0206168 A1 | * | 10/2004 | Katou et al. | .................. 73/146 |
| 2004/0222882 A1 | * | 11/2004 | Miyazaki | .................... 340/445 |

FOREIGN PATENT DOCUMENTS

| | | |
|---|---|---|
| JP | 11-78447 | 3/1999 |
| JP | 2000-71726 | 3/2000 |

* cited by examiner

*Primary Examiner*—Max Noori
(74) *Attorney, Agent, or Firm*—Finnegan, Henderson, Farabow, Garrett & Dunner, L.L.P.

(57) ABSTRACT

A tire inflation pressure detecting device includes sensors provided in respective tires of a vehicle to detect various kinds of measured data involving a tire inflation pressure, transmitters for transmitting the measured data and a receiver for receiving the measured data transmitted from the transmitters. In operation, each of the transmitters of the tires transmits the measured data plural times at certain transmitting intervals in a predetermined cycle. Among the transmitters, the respective transmitting intervals are different from each other.

7 Claims, 5 Drawing Sheets

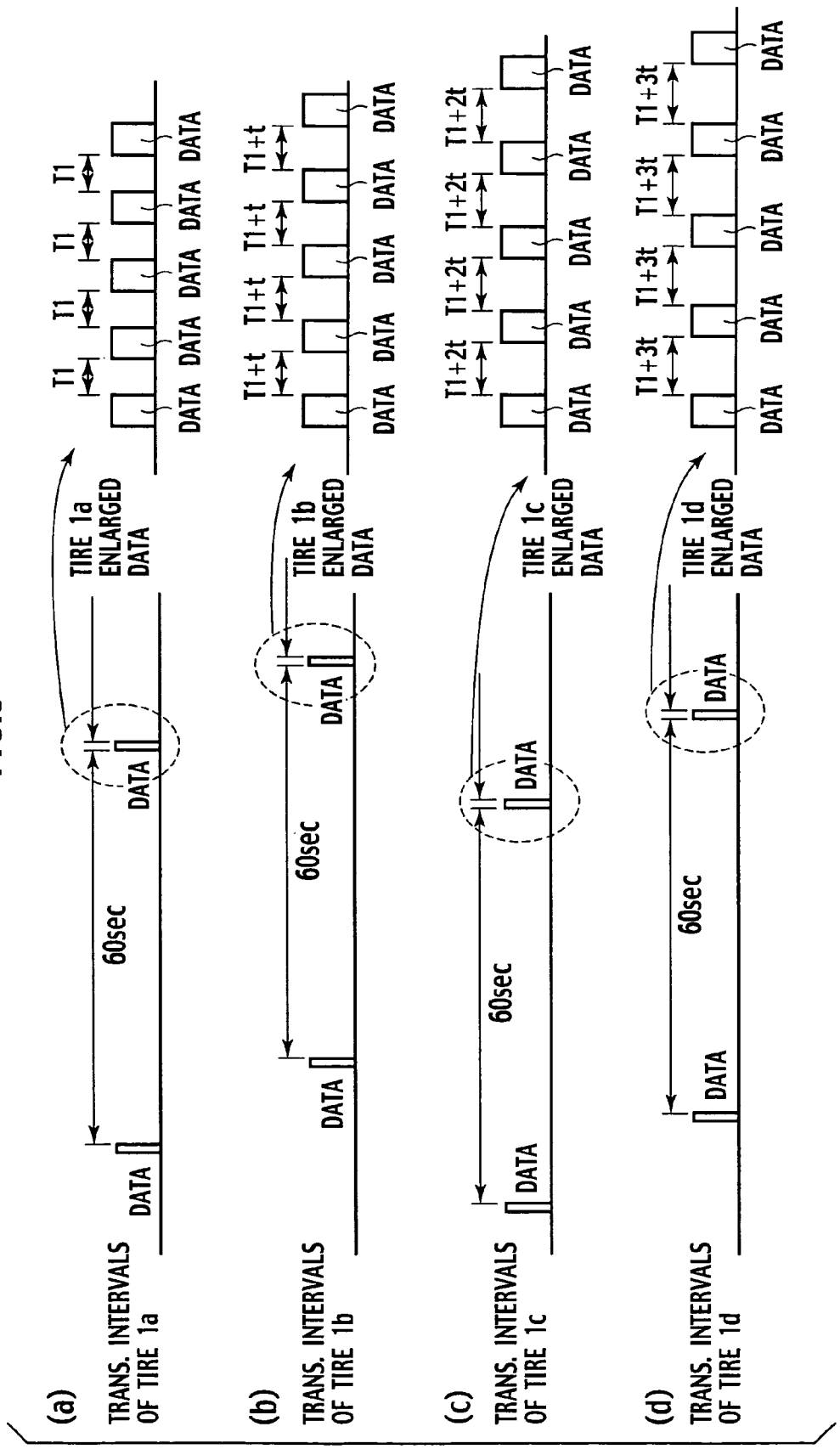

TIRE INFLATION PRESSURE DETECTING DEVICE FOR VEHICLE

BACKGROUND OF THE INVENTION

The present invention relates to a tire inflation pressure detecting device for detecting tire inflation pressure of a vehicle and particularly, it relates to a technique for specifying respective positions of the tires.

There has been proposed and practically used a tire inflation pressure detecting device that detects tire inflation pressures of a vehicle at it traveling and provides resulting pressure information to a passenger in the vehicle in real time.

The tire inflation pressure detecting device in an earlier art has pneumatic sensors each arranged in respective tires of the vehicle to detect respective tire inflation pressures, transmitters each arranged in the tires to transmit so-obtained tire inflation pressure data to the outside and a receiver arranged in a vehicle body to receive the tire inflation pressure data. Then, the tire inflation pressure data received by the receiver is displayed on display means to the passenger.

In the tire inflation pressure detecting device, however, it is impossible to identify which of the tires corresponds to the received tire inflation pressure data. In detail, since the receiver is adapted so as to receive the tire inflation pressure data transmitted from the transmitters installed in four tires, if the tire inflation pressure is reduced, it is impossible to recognize which of the four tires is subjected to a reduction in tire inflation pressure.

Under such a situation, Japanese Patent Application Laid-open Nos. 2000-71726 and 11-78447 disclose a method of specifying the position of a tire subjected to a reduction in tire inflation pressure. According to the method, respective identifying codes are established to the transmitters in the tires while storing the identifying codes in a memory (EEPROM) of the receiver. On the establishment, it is carried out to compare the identifying codes involved in the pressure data transmitted from the transmitters with the identifying codes stored in the memory, thereby specifying the tire having a reduced pressure.

In the above conventional method, however, the tire inflation pressure detecting device has a tendency to be a grand production since the receiver has to be equipped with the memory (EEPROM) and the identification codes stored therein must be compared with the identification codes on the transmitters' side. Additionally, since the compliance relationship between the identification codes on the transmitters' side and the identification codes stored in the EEPROM would collapse at a "tire-rotation" where the conventional positions of the tires are modified in view of improving their lives, it is necessary to rewrite the identification codes stored in the EEPROM, requiring lots of labor for rewriting them.

As one method of solving the above problem, there may be expected a two-way radio communication that enables the tires to be specified with no identification code owing to two-way communication between the tires' side and the vehicle's side. Also in this case, however, the tire inflation pressure detecting device would be large sized while causing the manufacturing cost to be elevated.

SUMMARY OF THE INVENTION

Under the circumstances, it is therefore an object of the present invention to provide a tire inflation pressure detecting device which is simple in structure and which is capable of identifying a tire having a reduced tire inflation pressure.

According to the present invention, the above object of the present invention described above can be accomplished by a tire inflation pressure detecting device for detecting tire inflation pressure of a vehicle, comprising: tire inflation pressure sensors respectively arranged in a plurality of tires of the vehicle, for detecting respective tire inflation pressures; transmitting units arranged in the tires respectively and in the vicinity of the tire inflation pressure sensors, for transmitting pressure data detected by the tire inflation pressure sensors; and a receiving unit for receiving the pressure data transmitted by the transmitting units, wherein the transmitting units are configured to transmit the pressure data plural times at identical transmitting intervals at every predetermined cycle, the transmitting intervals being different from each other among the transmitting units, and the receiving unit is configured to recognize the transmitting intervals of the pressure data transmitted from the transmitting units thereby identifying the transmitting units being as senders of the pressure data.

Since the transmitting intervals of the pressure data transmitted from the transmitters of the plural tires are established to be different from each other every tire, by detecting the transmitting intervals on the receiver's side, it becomes possible to recognize which of the transmitters has transmitted the pressure data on the receiver's side. Accordingly, it is possible to provide a passenger of the vehicle with the pressure data in the form where they correspond to the tires respectively and certainly, without adding the identification codes.

Additionally, since the transmitting intervals of the pressure data are different from each other every tire, it is possible to prevent an interference among the pressure data transmitted from the plural transmitters, whereby the reception of the pressure data can be accomplished with high accuracy.

In a preferred embodiment of the present invention, the predetermined cycle may be established to be an identical time to each other among the transmitting units and the number of the plural times is established to be an identical number to each other among the transmitting units.

Since the transmitting units commonly transmit the respective pressure data for the plural times of an identical number (e.g. five times) at the every cycle of an identical period (e.g. 60 sec.), it is possible to detect the pressure data transmitted from the transmitting units with uniform receiving accuracy, on the receiving unit's side of the device.

The transmitting units may be configured to enable the respective transmitting intervals of the respective pressure data transmitted from the transmitting units to be changed.

Since the transmitting units are capable of changing the regular intervals of the pressure data transmitted from the transmitting units, even if the positions of the tires are altered due to the tire rotation, a modification of the regular intervals of the pressure data on the transmitting units' side of the device would allow the so-changed positions of the tires to correspond to the regular intervals of the pressure data appropriately without rewriting the data on the receiving unit's side of the device.

The respective transmitting intervals of the pressure data transmitted from the transmitting units may be changed by outside trigger signals that the transmitting units receive.

Then, owing to the provision of the outside trigger, it is possible to accomplish an operator's work for the above modification with ease.

The tire inflation pressure detecting device further comprises a single antenna arranged in the vicinity of the receiving unit, for receiving the respective pressure data transmitted from the transmitting units.

Owing to the provision of the single antenna in place of a plurality of antennas, the constitution of the device can be simplified.

Alternatively, the tire inflation pressure detecting device further comprises a plurality of antennas arranged in the vicinity of the transmitting units, for receiving the respective pressure data transmitted from the transmitting units respectively, wherein the antennas are connected to the receiver via coaxial cables.

In this case, due to the positioning of the antennas close to the transmitting units, the receipt sensitivity of the pressure data is improved with high accuracy.

The tire inflation pressure detecting device further comprises a display unit connected to the receiving unit in the vehicle, for displaying the pressure data to a passenger in the vehicle.

Then, owing to the provision of the display unit, the passenger can recognize the pressure data visually.

These and other objects and features of the present invention will become more fully apparent from the following description and appended claims taken in conjunction with the accompany drawings.

BRIEF DESCRIPTION OF THE DRAWINGS

FIG. 5 is a timing chart showing the operation of the tire inflation pressure detecting device of the first embodiment;

DESCRIPTION OF THE PREFERRED EMBODIMENT

Embodiments of the present invention will be described with reference to the accompanying drawings.

Figure 1:
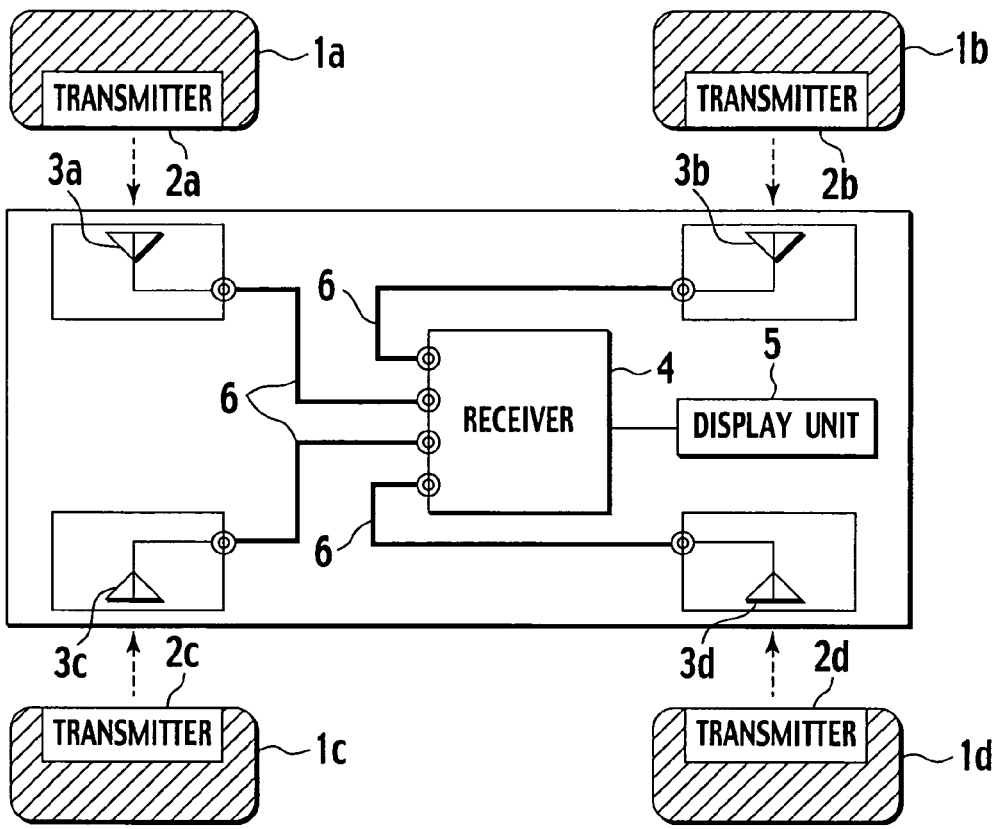
FIG. 1 is a block diagram showing the constitution of a tire inflation pressure detecting device in accordance with the first embodiment of the present invention.

FIG. 1 is a block diagram showing the constitution of a tire inflation pressure detecting device in accordance with the first embodiment of the present invention. In FIG. 1, the tire inflation pressure detecting device includes transmitters (i.e. the transmitting units of the invention) 2a to 2d provided in four tires 1a to 1d of a vehicle respectively and antennas 3a to 3d arranged in the vicinity of the tires 1a to 1d respectively.

A vehicle body is provided, at an appropriate position thereof, with a receiver 4 which is connected to the antennas 3a to 3d through coaxial cables 6. Further, the vehicle body is equipped with a display unit 5 that displays the pressure data received by the receiver (i.e. the receiving unit of the invention) 4 to a passenger of the vehicle.

Figure 2:
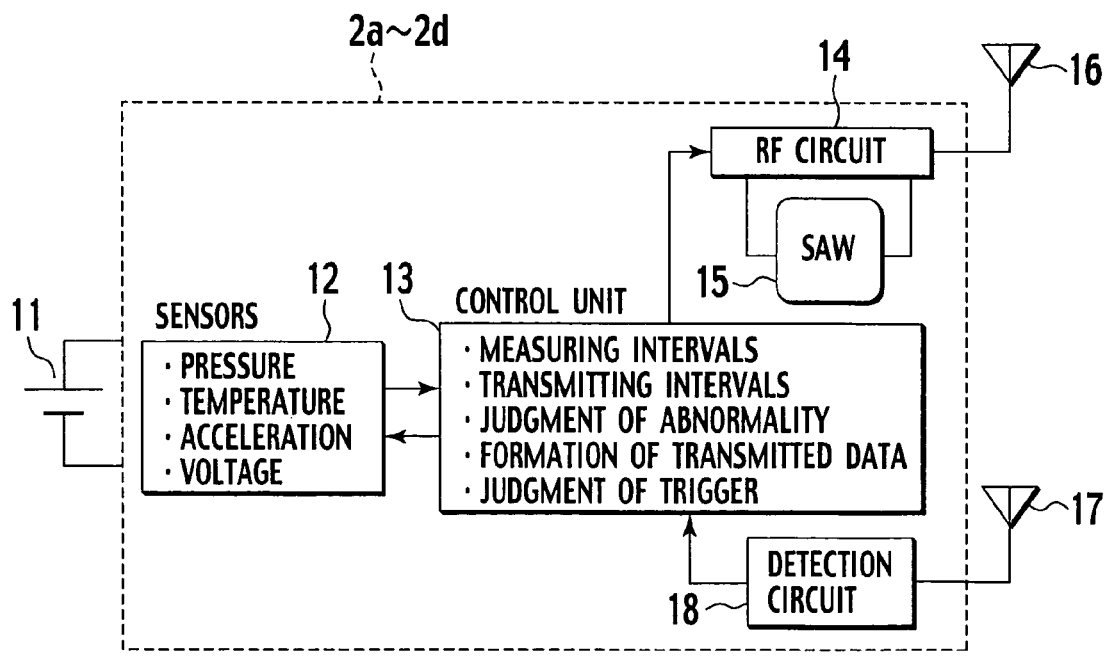
FIG. 2 is a block diagram showing the constitution of a transmitter.

FIG. 2 is a block diagram showing each of the transmitters 2a to 2d provided in the tires 1a to 1d, respectively. As shown in FIG. 2, the transmitter 2a (2b, 2c, 2d) includes a battery 11 for power supply, sensors 12 for detecting a tire inflation pressure, its temperature, an acceleration of vehicle and a voltage of the battery 11 and a control unit 13 that establishes measuring and transmitting intervals of respective data from the sensors 12, produces measured data to be transmitted and also performs both triggered judgments and abnormality judgments.

Additionally, the transmitter 2a (2b, 2c, 2d) further includes a RF (Radio Frequency) circuit 14 for transmitting various measured data including the pressure data, a SAW (Surface Acoustic Wave) filter 15 for eliminating resilient ground waves propagating on a solid surface and a transmission antenna 16.

Moreover, the transmitter 2a (2b, 2c, 2d) further includes a receiver antenna 17 for receiving trigger inputs from the outside and a detection circuit 18 that demodulates received signals to output them to the control unit 13.

Each of the transmitters 2a, 2b, 2c, 2d transmits transmission data group at predetermined transmitting intervals at every cycle, for example, every 60 seconds.

For instance, it is established so that the transmitter 2a transmits the transmission data at intervals of T1 for five times, the transmitter 2b at regular transmitting intervals of (T1+t) for five times, the transmitter 2c at regular transmitting intervals of (T1+2t) for five times, and the transmitter 2d transmits the transmission data at regular transmitting intervals of (T1+3t) for five times.

Figure 3:
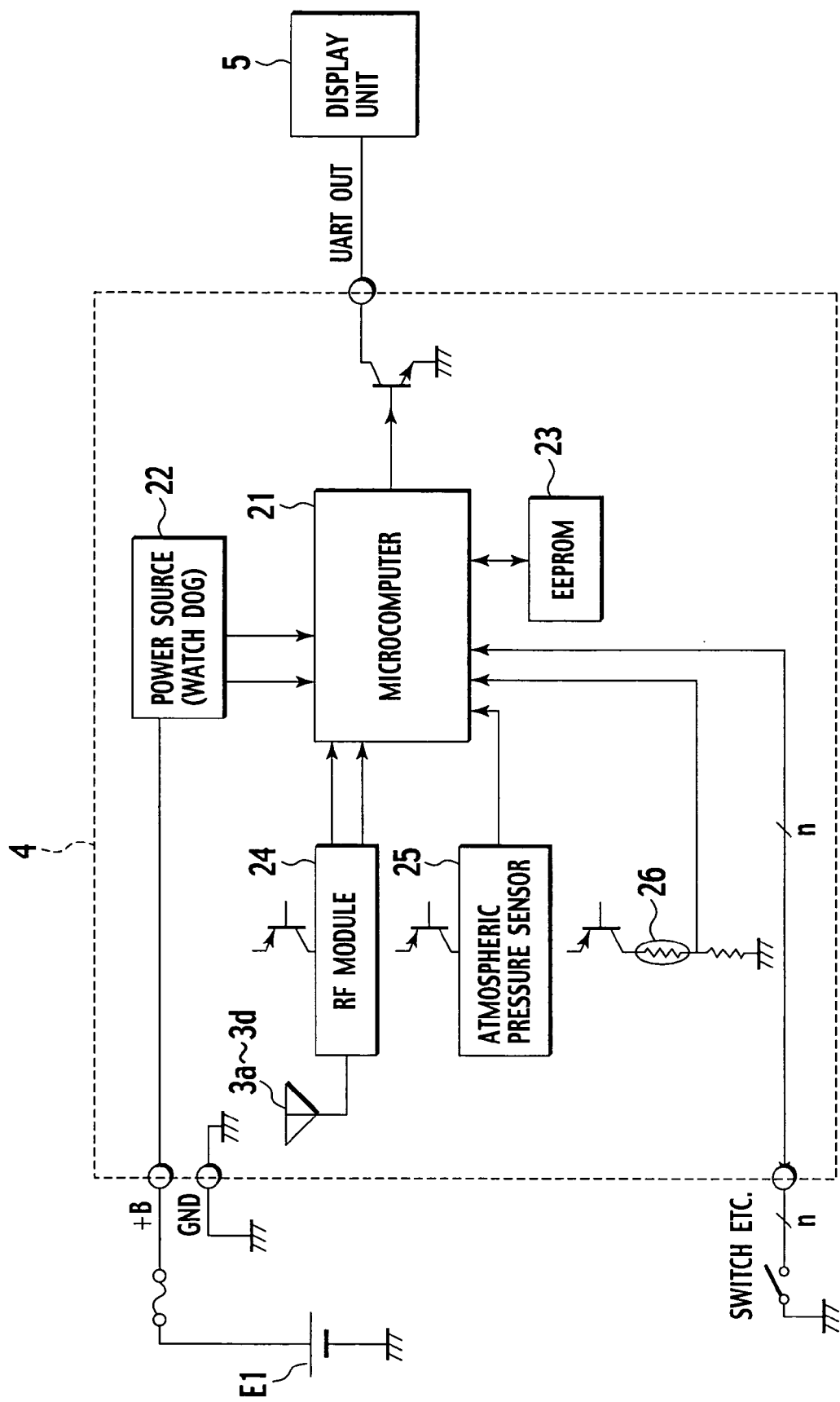
FIG. 3 is a block diagram showing the constitution of a receiver.

FIG. 3 is a block diagram showing the constitution of the receiver 4. As shown in this figure, the receiver 4 includes a microcomputer 21 that performs main controls, a power source 22 having a "watch dog" function to produce a power voltage for driving the microcomputer 21 by a voltage outputted from a battery power source E1 and an EEPROM (Electronically Erasable and Programmable Read Only Memory) 23.

The receiver 4 further includes a RF (radio frequency) module 24 that detects the radio frequency of a transmission signal received by each antenna 3a (3b, 3c, 3d), an atmospheric pressure sensor 25 for measuring an atmospheric pressure and a thermistor 26 for measuring a temperature in the receiver 4.

The microcomputer 21 detects a pressure data contained in the measured data obtained by the RF module 24 and also judges which of four transmitters 2a to 2d has outputted the above pressure data, on the ground of the microcomputer's receiving intervals of the pressure data. Then, the microcomputer 21 outputs the so-detected pressure data to the display unit 5 via an in-vehicle communication line.

The EEPROM 23 memorizes an inherent identification (ID) code in common with the transmitters 2a to 2d of the relevant vehicle. That is, memorized in the EEPROM 23 is the identification code for distinguishing a transmission data, which has been transmitted from transmitters installed in tires of the other vehicle, from another transmission data transmitted from the transmitters 2a to 2d installed in the tires 1a to 1d of the relevant vehicle. Therefore, if radio waves from the transmitters of the other vehicle are so weak that the possibility of receiving the transmission data of the other vehicle becomes low, such an identification code would be dispensable.

Figure 4:
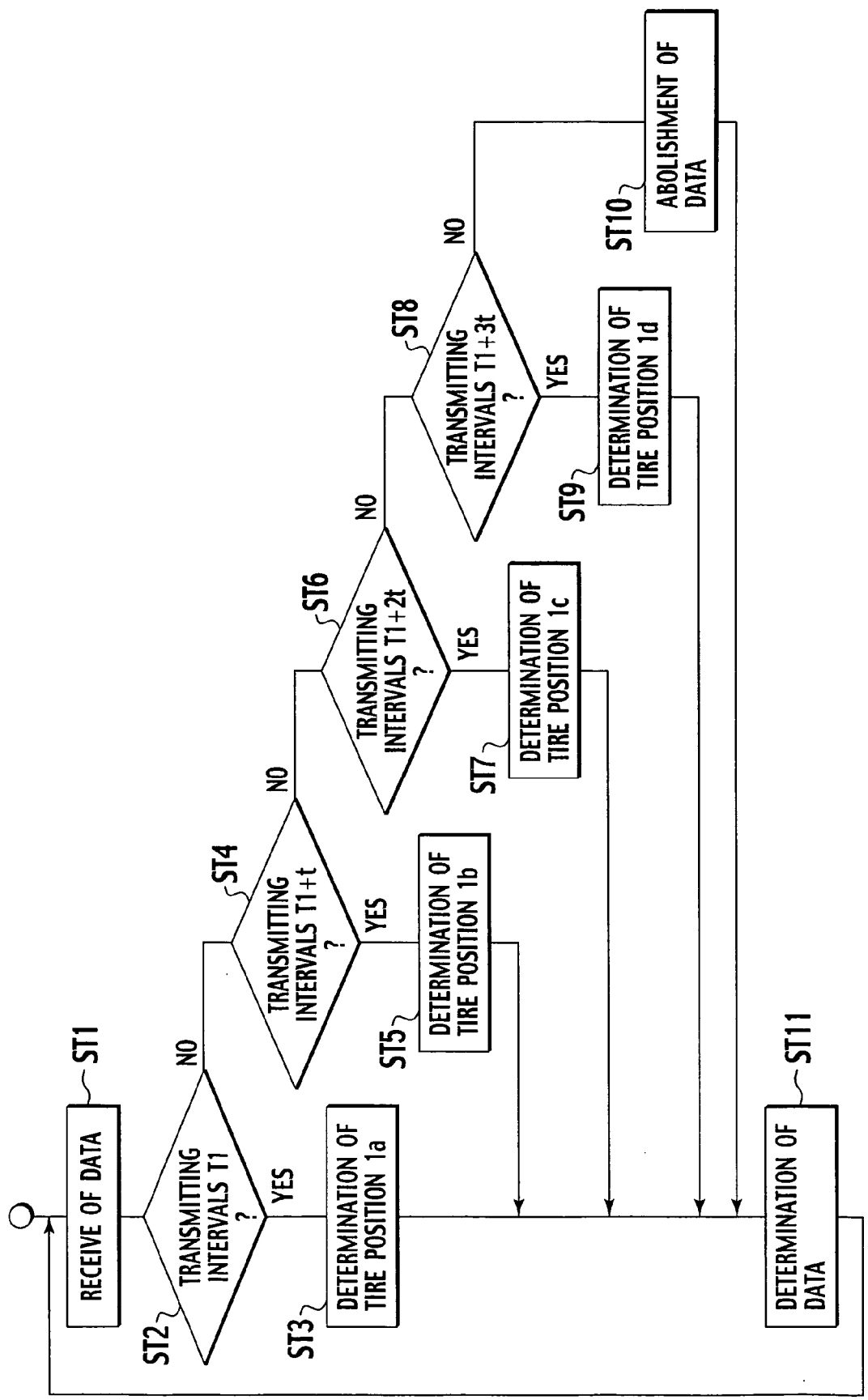
FIG. 4 is a flow chart showing the operation of the tire inflation pressure detecting device of the first embodiment.

Next, the operation of the tire inflation pressure detecting device will be described with reference to a flow chart of FIG. 4 and a timing chart of FIG. 5.

Figure 6A:
FIG. 6A is a view for explanation of a transmission data used in the tire inflation pressure detecting device of the present invention and FIG. 6B is a view for explanation of a transmission data used in the conventional tire inflation pressure detecting device.
Figure 6B:
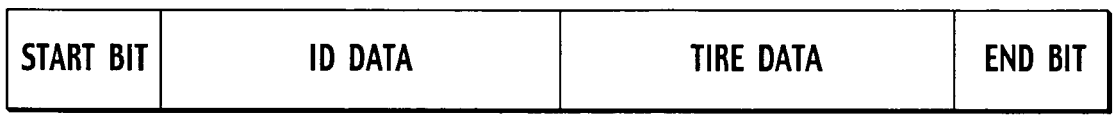

As shown in (a) of FIG. 5, on the assumption that a period of 60 seconds form one cycle (predetermined cycle), the transmitter 2a of the tire 1a performs one group of data transmission per one cycle. In one group of data transmission, the transmitter 2a is configured to carry out five data-transmissions at regular transmitting intervals of time T1. As shown in FIG. 6A, each of the data-transmissions comprises a data row composed of a start bit, tire data and an end bit. In comparison with the conventional data row of FIG. 6B, the data row of the embodiment is remarkably small in terms of volume of data because of no addition of an identification (ID) data.

As shown in (b) of FIG. 5, on the assumption that a period of 60 seconds form one cycle (predetermined cycle), the transmitter 2b of the tire 1b performs one group of data transmission per one cycle. In one group of data transmission, the transmitter 2b is configured to carry out five data-transmissions at regular transmitting intervals of time (T1+t) somewhat longer than the above time T.

Similarly, as shown in (c) of FIG. 5, the transmitter 2c of the tire 1c is configured to carry out five data-transmissions at regular intervals of time (T1+2t), while the transmitter 2d of the tire 1d is configured to carry out five data-transmissions at regular transmitting intervals of time (T1+3t), as shown in (d) of FIG. 5.

In the above embodiment, it is noted that the respective transmitters 2a to 2d commonly perform the data-transmissions in the same cycle (60 sec.), each of which consists of the same number (five) of data rows. In the modification, the transmitters 2a to 2d may perform the data-transmissions in the different cycle to each other. Additionally, one group of data-transmission may consists of the different number of data rows.

Referring to the flow chart of FIG. 4, the order of the processes carried by the microcomputer 21 of the receiver 4 will be described below.

First, at step ST1, it is carried out for the receiver 4 to receive a measured data. At next step ST2, it is executed to judge whether the communication interval of the measured data is identical to the time T1. If the communication interval is the time T1 (Yes at step ST2), then the routine goes to step ST3 where it is judged that the measured data is one transmitted from the tire 1a.

When the communication interval is not the time T1 (No at step ST2), the routine goes to step ST4 where it is executed to judge whether the communication interval is the time (T1+t). If the judgment at step ST4 is Yes, that is, the communication interval of the time (T1+t), the routine goes to step ST5 where it is judged that the measured data is one transmitted from the tire 1b.

While, if the communication interval is not the time (T1+t) (No at step ST4), the routine goes to step ST6 where it is executed to judge whether the communication interval is the time (T1+2t). If the judgment at step ST6 is Yes, that is, the communication interval of the time (T1+2t), the routine goes to step ST7 where it is judged that the measured data is one transmitted from the tire 1c.

When the communication interval is not the time (T1+2t) (No at step ST6), the routine goes to step ST8 where it is executed to judge whether the communication interval is the time (T1+3t). If the judgment at step ST8 is Yes, that is, the communication interval of the time (T1+3t), the routine goes to step ST9 where it is judged that the measured data is one transmitted from the tire 1d.

Further, if the communication interval is not the time (T1+3t) (No at step ST8), the routine goes to step ST10 where it is executed to decimate the measured data.

Subsequently, at step ST11, it is executed for the microcomputer 21 to produce data where various kinds of data containing the pressure data in the transmitted data correspond to the relevant tires respectively and further executed to display such a data on the display unit 5.

In this way, various kinds of data including the pressure data are displayed on the display unit 5, in the form where they correspond to the tires 1a to 1d respectively.

Thus, according to the embodiment, the transmitters 2a to 2d of the tires 1a to 1d transmit the measured data at different intervals from each other. Thus, by measuring an interval to receive the measured data, it is possible for the receiver 4 to recognize which of the transmitters 2a to 2d has transmitted. In other words, it is possible to recognize which of the tires the measured data does correspond to.

Thus, since the display unit 5 is capable of displaying the measured data in a manner that the tires 1a to 1d correspond to the tire inflation pressures respectively, a passenger of the vehicle can recognize the tire inflation pressures of the respective tires 1a to 1d in real time. Additionally, when the reduction in tire inflation pressure is detected, it is possible to specify a tire whose pressure is reduced, immediately. As a result, it is possible to devise a prompt countermeasure against such a reduction in tire inflation pressure. Additionally, since the transmitters 2a to 2d transmits the measured data respectively at different intervals from each other, it is possible to prevent an interference of the measured data in the receiver 4.

Receiving outside trigger signals transmitted from a trigger unit (not shown), the transmitters 2a to 2d can change the above transmitting intervals established for the transmitters 2a to 2d to other intervals. In detail, the receiver antenna 17 of FIG. 2 receives trigger signals transmitted from the trigger unit. Then, the so-received trigger signals are supplied to the control units 13 of the respective transmitters 2a to 2d through the respective detecting circuits 18. On receipt of each trigger signal, the control unit 13 is capable of changing the transmitting intervals to desired values.

Due to the above-mentioned transmitters' capability of changing the transmitting intervals of the measured data to respective transmitting intervals inherent in the positions of the tires, even if the positions of the tires are altered due to tire rotation, it is possible to allow new positions of the tires to correspond to respective measured data.

Accordingly, as there is no need to discriminate the identification cords of the tires, it is unnecessary to allow the receiver 4 to memorize the identification codes corresponding to the tires 1a to 1d in a memory unit, such as EEPROM. The, the tire inflation pressure detecting device can be simplified and saved in manufacturing cost. Further, when it is required to carry out tire rotation or tire exchange, it has only to alter the transmitting intervals of the measured data established in the respective transmitters 2a to 2d by means of the outside trigger. Thus, since the provision of the outside trigger dispenses with such a complex work as rewriting the identification codes for the tires 1a to 1d stored in the receiver 4, it is possible to improve the device's convenience at the tire rotation or exchange. Consequently, both of the transmitters and the receiver can be simplified in their control system.

Additionally, as shown in FIG. 6A, since the measured data is not required to include the identification data for discriminating the tires 1a to 1d, the data length of the measured data can be shortened to improve the device's power saving function. In connection, it is also possible to extend the life span of the battery 11.

Since the antenna 3a to 3d are positioned in the vicinity of the tires 1a to 1d, the arrangement allows the receiver's receiving sensitivity to be improved.

Figure 7:
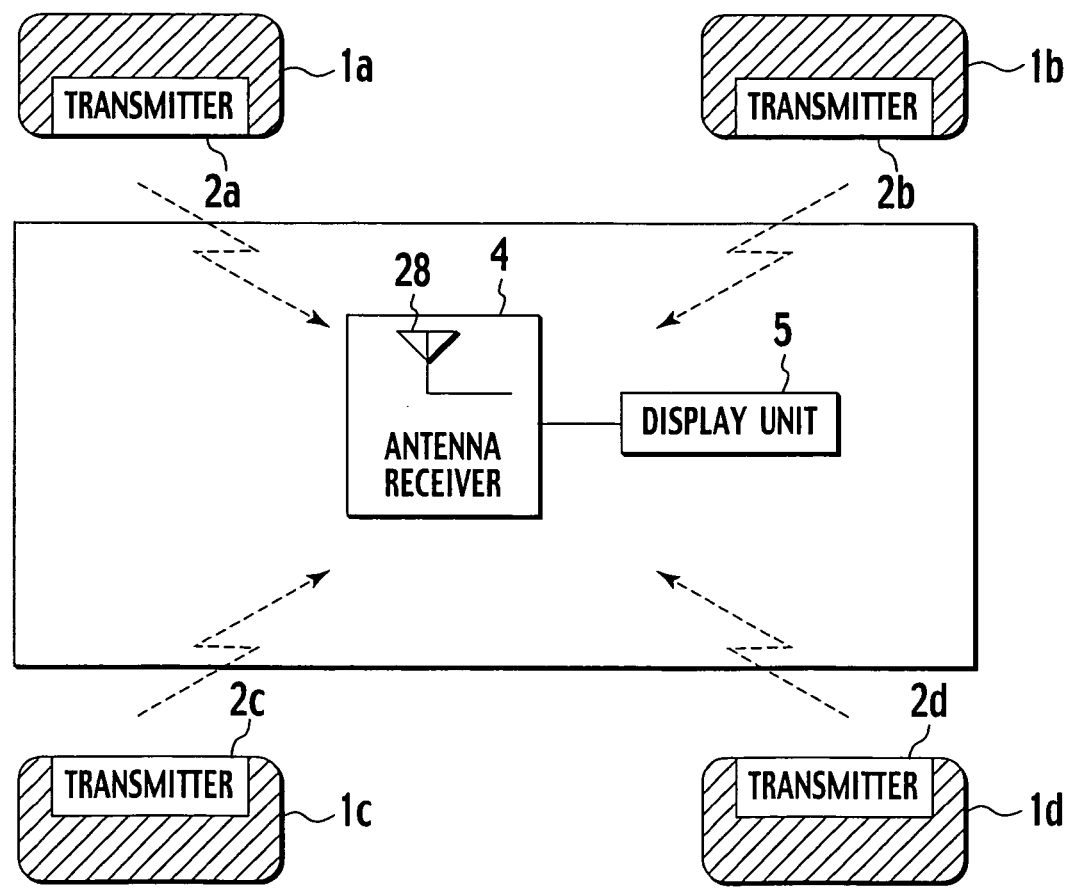
FIG. 7 is a block diagram showing the constitution of the tire inflation pressure detecting device in accordance with the second embodiment of the invention.

FIG. 7 is a block diagram showing the constitution of the tire inflation pressure detecting device in accordance with the second embodiment of the present invention. Noted, in the second embodiment, elements identical to those of the first embodiment will be indicated with the same reference numerals respectively.

As shown in the figure, the tire inflation pressure detecting device is similar to that of the first embodiment except that the measured data transmitted from the transmitters 2a to 2d are received by an antenna 28 attached to the receiver 4 in the second embodiment while the measured data are received by the antennas 3a to 3d close to the transmitters 2a to 2d in the first embodiment.

According to the second embodiment, it is possible to simplify the structure of the device while maintaining the effects of the first embodiment since there is no need to wire the coaxial cables 6 for connecting the antennas 3a to 3d with the receiver 4.

The present invention has been described hereinabove by examples of the shown embodiments. The invention is not limited to these embodiments and therefore, the constituents of the invention may be replaced by optional constituents having the similar functions.

For instance, although the invention is applied to the vehicle equipped with four tires in common with the embodiments, the present invention is applicable to a vehicle equipped with five or more tires.

What is claimed is:

1. A tire inflation pressure detecting device for detecting tire inflation pressure of a vehicle, comprising:

tire inflation pressure sensors respectively arranged in a plurality of tires of the vehicle, for detecting respective tire inflation pressures;

transmitting units arranged in the tires respectively and in the vicinity of the tire inflation pressure sensors, for transmitting pressure data detected by the tire inflation pressure sensors; and a receiving unit for receiving the pressure data transmitted by the transmitting units, wherein the transmitting units are configured to transmit the pressure data, over a frequency, plural times at identical transmitting intervals at every predetermined cycle, the transmitting intervals being different from each other among the transmitting units, and the receiving unit is configured to recognize the transmitting intervals of the pressure data transmitted from the transmitting units thereby identifying the transmitting units being as senders of the pressure data.

2. The tire inflation pressure detecting device as claimed in claim 1, wherein the predetermined cycle is established to be an identical time to each other among the transmitting units and the number of the plural times is established to be an identical number to each other among the transmitting units.

3. The tire inflation pressure detecting device as claimed in claim 1, wherein the transmitting units are configured to enable the respective transmitting intervals of the respective pressure data transmitted from the transmitting units to be changed.

4. The tire inflation pressure detecting device as claimed in claim 3, wherein the respective transmitting intervals of the pressure data transmitted from the transmitting units are changed by outside trigger signals that the transmitting units receive.

5. The tire inflation pressure detecting device as claimed in claim 1, further comprising an antenna arranged in the vicinity of the receiving unit, for receiving the respective pressure data transmitted from the transmitting units.

6. The tire inflation pressure detecting device as claimed in claim 1, further comprising antennas arranged in the vicinity of the transmitting units, for receiving the respective pressure data transmitted from the transmitting units respectively, wherein the antennas are connected to the receiver via coaxial cables.

7. The tire inflation pressure detecting device as claimed in claim 1, further comprising a display unit connected to the receiving unit in the vehicle, for displaying the pressure data to a passenger in the vehicle.

* * * * *